(12) United States Patent
Harb et al.

(10) Patent No.: US 10,187,687 B2
(45) Date of Patent: Jan. 22, 2019

(54) SYSTEMS AND METHODS FOR CREATING RATED AND CURATED SPECTATOR FEEDS

(71) Applicant: Rovi Guides, Inc., Santa Clara, CA (US)

(72) Inventors: Reda Harb, Bellevue, WA (US); Michael R. Nichols, La Canada Flintridge, CA (US); Walter R. Klappert, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/934,370

(22) Filed: Nov. 6, 2015

(65) Prior Publication Data
US 2017/0134793 A1 May 11, 2017

(51) Int. Cl.
| | |
|---|---|
| *H04N 21/431* | (2011.01) |
| *H04N 21/422* | (2011.01) |
| *H04N 21/61* | (2011.01) |
| *H04N 21/2665* | (2011.01) |
| *H04N 21/44* | (2011.01) |
| *H04N 21/84* | (2011.01) |
| *H04N 21/41* | (2011.01) |
| *G06K 9/00* | (2006.01) |

(52) U.S. Cl.
CPC ..... *H04N 21/4312* (2013.01); *G06K 9/00758* (2013.01); *H04N 21/2665* (2013.01); *H04N 21/4122* (2013.01); *H04N 21/42203* (2013.01); *H04N 21/44008* (2013.01); *H04N 21/6125* (2013.01); *H04N 21/84* (2013.01)

(58) Field of Classification Search
CPC .......... G06F 17/30823; G06F 17/3084; H04N 21/4532; H04N 21/454; H04N 21/458; H04N 21/4622; H04N 21/47205; H04N 21/4755; H04N 21/6125; H04N 21/4312; H04N 21/44008; H04N 21/2665; H04N 21/84; G06K 9/00758
See application file for complete search history.

(56) References Cited

U.S. PATENT DOCUMENTS

| | | | |
|---|---|---|---|
| 7,233,935 B1 * | 6/2007 | Chandler | G06N 5/048 706/23 |
| 7,269,838 B1 | 9/2007 | Boyer et al. | |
| 8,631,436 B2 | 1/2014 | Arrasvuori et al. | |
| 9,124,932 B2 | 9/2015 | Schein et al. | |
| 9,426,509 B2 | 8/2016 | Ellis et al. | |
| 2002/0170068 A1 * | 11/2002 | Rafey | G06F 17/30823 725/112 |

(Continued)

*Primary Examiner* — Ricky Chin
*Assistant Examiner* — Jen-Shi Huang
(74) *Attorney, Agent, or Firm* — Haley Guiliano LLP

(57) ABSTRACT

Methods and systems for a media guidance application that may enhance viewer experience. The media guidance application may receive video assets from content capture devices at different locations, determine characteristics of the media assets and assign content tags, corresponding to the characteristics, to the media assets. The media guidance application may receive a video-feed request from another location and determine video feed criterion associated with the request. The media guidance application may use a database to determine media assets with characteristics matching the video feed criterion, and may generate for display the media assets in a video feed.

14 Claims, 8 Drawing Sheets

(56) References Cited

U.S. PATENT DOCUMENTS

| | | | |
|---|---|---|---|
| 2007/0204310 A1* | 8/2007 | Hua | H04N 7/17318 |
| | | | 725/88 |
| 2008/0178232 A1* | 7/2008 | Velusamy | H04N 5/23203 |
| | | | 725/88 |
| 2009/0290848 A1* | 11/2009 | Brown | H04N 5/232 |
| | | | 386/223 |
| 2010/0235857 A1* | 9/2010 | Lestage | G11B 27/036 |
| | | | 725/37 |
| 2010/0289114 A1* | 11/2010 | Kronholz | H01L 21/823418 |
| | | | 257/506 |
| 2011/0078628 A1 | 3/2011 | Rosenberg | |
| 2012/0117584 A1 | 5/2012 | Gordon | |
| 2013/0097644 A1* | 4/2013 | Brande | H04N 21/6408 |
| | | | 725/93 |
| 2013/0205315 A1 | 8/2013 | Sinha et al. | |

* cited by examiner

600

600 ...

601 Initialization Subroutine

602 ...

603 //Routine to Determine Whether a Characteristic of a Media Asset Needs to be Updated:

604

605 Receive Characteristics

606 For Each Characteristic:

607    A = Accessed Value of the Characteristic:

608    B = Accessed Value of Threshold Certainty Value

609      If(Abs(A-B)<=Tolerance)

610          Execute Subroutine to Determine Default Characteristic Approval Settings Using Control Circuitry 611      Else If(A<B)

612          Execute Subroutine to Confirm the Characteristic for the Media asset Using Control Circuitry 613      Else 614          Execute Subroutine to Have a Human Curator Confirm or Modify the Characteristic Using Control Circuitry 615    Execute Subroutine to Search for New Media Assets to Assign Characteristics Using Control Circuitry

616 ...

617 Termination Subroutine

800 ···
801 Initialization Subroutine
802 ···
803 //Routine to Search a Database for Characteristics Based on User-specified Criterion.
804
805   Receive Instances of User-specified Criterion
806   For Each Instance of a User-specified Criterion:
807     Query Database Containing Possible Characteristics for Entries Matching the User-specified Criterion
808       If(Number of Matching Entries > 0)
809         Retrieve Value of the Event Characteristic from Database Entries Matching the User-specified Criterion
810         Execute Subroutine to Indicate that the Media Asset is a Match Using Control Circuitry
811
812

813       Else
814         Execute Subroutine to Continue Monitoring the Media Asset Using Control Circuitry
815   Execute Subroutine to Search for Additional Media Assets using Control Circuitry
816 ···
817 Termination Subroutine
818 ···

FIG. 8

SYSTEMS AND METHODS FOR CREATING RATED AND CURATED SPECTATOR FEEDS

BACKGROUND

With the development of platforms for sharing media assets, users of a media guidance application may want to generate for display, in addition to conventional programming, media content which includes user-generated videos. However, with conventional media guidance applications, users may be unable to access user-generated videos and to generate for display these user-generated videos, including videos showing user reactions to live events or programming. Accordingly, users of a media guidance application may find that they are unable to share their reactions to certain programming or certain live events with other users of a media guidance application. Alternatively, users of a media guidance application may find that they are unable to filter user-generated videos before generating them for display. Accordingly, users of a media guidance application may find that they are forced to either forgo sharing videos of user reactions or be subjected to all user-generated videos which likely include inappropriate or undesirable user reactions.

SUMMARY

Accordingly, methods and systems are disclosed herein for a media guidance application that solves the aforementioned problems by providing users with an opportunity to share their reactions to media programming or live events through user-generated videos, and to generate for display these user-generated videos, subject to content filtering. For example, the media guidance application may provide options to generate for display user-generated videos in a picture-in-picture window, and options to filter the content of the user-generated videos according to user preferences. Advantageously, the media guidance application enhances the user experience by allowing users to share reactions and to be part of a collective experience while remaining in the comfort of their home.

To do so, the media guidance application may receive and process, at a server, media assets (e.g., user reactions to programming) from multiple user devices, and identify a subset of the received media assets matching set user preferences (e.g., user reactions to specific programming) before generating for display the subset at another user device.

In some aspects, the media guidance application may receive at a server, a first video asset from a first content capture device at a first location and a second video asset from a second content capture device at a second location. For example, the media guidance application may receive at a server, a video uploaded by John to the server with his cellphone. In this example, the media guidance application may also receive at the server, a video uploaded by Claire to the server from the set-top box used by Claire. In this example, John may have been a spectator at the Capitals-Hurricanes hockey game in DC, and may have uploaded his reaction to TJ Oshie's goal in the first period. Claire may have been watching the Capitals-Hurricanes game from her home in Boston, and her reaction to the TJ Oshie goal may have been captured by her set-top box.

The media guidance application may, in near-real time, determine a first characteristic of the first video asset and assign a first content tag to the first video asset corresponding to the first characteristic. For example, the media guidance application may determine that a characteristic of John's video is "R" rated, due to his use of profanities. The media guidance application may determine that another characteristic of John's video is "Sports," "Hockey," "Capitals," or any combination thereof. In this example, the media guidance application may use, in real-time or near-real time, a combination of an Automatic Content Recognition algorithm and a human performing moderation to validate content recognition and associated characteristics.

The media guidance application may, in near-real time, determine a second characteristic of the second video asset and assign a second content tag to the second video asset corresponding to the second characteristic. For example, the media guidance application may determine that a characteristic of Claire's video is "cute" or "T-shirt humor" based on her facial expressions or because of the "I love TJ Oshie" t-shirt she was wearing in the video.

The media guidance application may receive a video-feed request from a third location. For example, Max may be watching the Capitals-Hurricanes game at home in Baltimore, by himself. Because Max may be missing his friends and the atmosphere of a hockey game, Max may request a video-feed of user-videos related to the Capitals-Hurricanes game.

The media guidance application may process the video feed request from the third location to determine a video feed criterion For example, Max may have requested a "funny" video feed specifically for the Capitals-Hurricanes game. Alternatively, Max may have specified, for example in a user profile, that his favorite hockey team is the Capitals, and that he is a 23 year old male. Accordingly, the media guidance application may only present videos of other Capitals fans, 23 year old males, etc.

The media guidance application may input the video feed criterion into a database listing characteristics that meet criteria to determine that the first characteristic and the second characteristic meet the video feed criterion For example, the media guidance application may input the video feed criterion from Max's request "funny" into a database listing corresponding characteristics. In this example, for a 23 year old male, "funny" may correspond to characteristics including "R" and "T-shirt humor."

The media guidance application may, in response to determining that the first characteristic and the second characteristic meet the video feed criterion, automatically generate for display a video feed including the first video asset and the second video asset on a display device at the third location. For example, the media guidance application may automatically generate for display at Max's device, a video feed which includes the video received from John's cell-phone, or the video received from Claire's set-top-box.

In some embodiments, the media guidance application performs automatic content recognition of the first video asset and the second video asset to determine the first characteristic and the second characteristic, using at least one of video recognition, text recognition and metadata analysis For example, the media guidance application may perform automatic content recognition of Claire's video to determine that her t-shirt reads "I love TJ Oshie" and because TJ Oshie is a player on the Capitals roster this is related to the Capitals and may be tagged "T-shirt humor." In this example, the media guidance application may also perform automatic recognition of Claire's facial expressions to detect if she is smiling, laughing or jumping up and down in excitement. In the same example, the media guidance application may perform automatic recognition on the video received from John's cell phone, to determine that John is yelling profanities, and the video may be tagged "R-rated." The media guidance application may also process the metadata associated with the video from John's cell phone and determine that the video was uploaded at Verizon Center, and may be tagged "Verizon Center."

In some embodiments, the media guidance application determines a level of uncertainty associated with the first or second content tags and provides the first video asset or second video asset to a human curator to approve or edit the first or second content tag. For example, the media guidance application may perform automatic content recognition on the video received from John's cell phone and determine with 40% confidence that John is saying "Let's go Caps." In this example the media guidance application may send John's video to a human curator to determine whether the media guidance application accurately interpreted John's words "Let's Go Caps" or whether John is saying something else. For example, in the event that the media guidance application was correct, the human curator may confirm the interpretation. Alternatively, in the event that the media guidance application was incorrect, the human curator may enter the correct interpretation, or enter a correct content tag, such as "R-rated" if John is swearing instead of saying "Let's go Caps."

In some embodiments, the media guidance application assigns a content corresponding to a characteristic which identifies a human curator. For example, a human curator may be identified by a specific content tag which may be an identification sequence, or a content tag which may be recognizable by users, such as "CapsFan123" or "JohnWalton."

In some embodiments, the media guidance application accesses a user profile and retrieves from the user profile the video feed criterion. For example, as described above Max may indicate in his user profile that his favorite teams are the Jaguars, the Capitals, and the Red Sox, that he is 23 years old, and enjoys funny home videos, and R-rated movies. In this example, the media guidance application may process information from Max's user profile and determine video feed criterion which match Max's interests.

In some embodiments, the media guidance application determines the video feed criterion automatically from user behavior. For example, the media guidance application may determine Max's favorite teams and like of R-rated movies based on when John typically tunes in, or which programs he most frequently watches, for example the Patriots, or R-rated movies.

In some embodiments, the media guidance application determines that a video feed is public and shares the video feed with other users. For example, the media guidance application may have received a video feed request from Max for funny R-rated videos related to the Capitals-Hurricanes game. In this example, other users may have similar interests and when the media guidance application makes Max's requested video-feed publicly available, other users may browse from a listing of video-feeds and select the video feed already requested by Max. In this example the other users would also see funny R-rated videos related to the Capitals-Hurricanes game. In this example, the users may not need to specify the characteristics of the video-feed and may just select to watch Max's pre-defined video feed.

In some embodiments, the media guidance application generates for display the video feed in a picture-in-picture window on the display device. For example, the media guidance application may allow Max to watch the Capitals-Hurricanes game on NHL Center Ice in full screen mode, but may also generate for display for Max the requested video-feed for funny R-rated videos related to the game in a picture-in-picture window. In this example, the media guidance application allows Max to watch the game from his home but also experience the kind of interactions Max enjoys when he goes to the game.

In some embodiments, the media guidance application generates for display the video feed on a display device at a fourth location. For example, the media guidance application may generate for display the video feed on Max's television in his living room, and on the television in his friend Jed's room. In this example the media guidance application generates for display the video feed request by Max in two different locations which may be within the same home network, or in different home networks.

In some embodiments, the media guidance application determines first and second characteristics which include actor, genre, year, theme and age rating. For example, the media guidance application may assign content tags such as "Johnny Depp" and "Comedy" to the movie "Pirates of the Caribbean."

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is exemplary pseudocode of an algorithm for determining whether a characteristic has a level of certainty above a specified certainty threshold, in accordance with some embodiments of the disclosure;

FIG. 8 is exemplary pseudocode of an algorithm for determining characteristics in a media asset, using a database containing characteristics and user-specified criterion, in accordance with some embodiments of the disclosure;

DETAILED DESCRIPTION OF DRAWINGS

Figure 1:
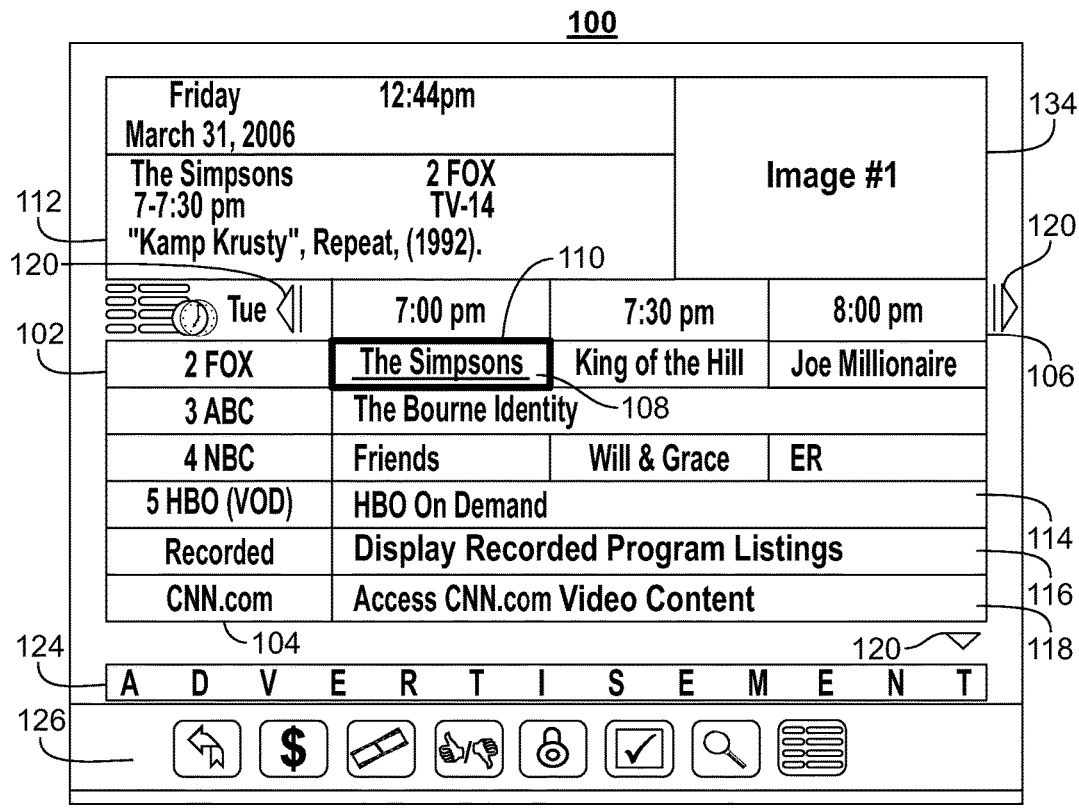
FIG. 1 shows an illustrative media guidance application for selecting media assets in accordance with some embodiments of the disclosure.

Methods and systems are disclosed herein for enhancing the viewing experience for users of a media guidance application. In any given content delivery system sharing content and reactions to content with other users is a substantial part of user's experience. Consequently, many users desire to watch user reactions to programs while simultaneously watching a program by using picture-in-picture windows, a full screen separate channel, or a full screen or partial screen interface to watch a video feed of user reactions to the program. An application that provides such features and guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

As referenced to herein, the term "near-real time" refers to a process running without significant delay for a user, for example on the order of seconds, milliseconds or microseconds.

As referenced to herein, the term "characteristic" refers to a property of a media asset including properties transparent to users, for example properties defined in metadata, and properties visible to users, for example, a title, an actor, a genre category, a production year, etc.

As referenced to herein, the term "content tag" refers to a non-hierarchical keyword or term to perform classification of media assets. For example a content tag "John Wayne" and a content tag "Western" may be assigned to a media asset which is a John Wayne western to represent and mark the actor characteristic and the genre characteristic of the media asset.

As referenced to herein, the term "criterion" refers to requirements which are used to filter media assets. For example, at least one characteristic of a media asset has to comply with or match with criterion in order for that media asset to be filtered and generated for display to a user.

As referenced to herein, the term "pre-defined" or "pre-determined" may be used interchangeably and refer to properties set directly or indirectly as a result of an automatic action from the media guidance application.

As referenced to herein, the term "user-defined" or "user-specified" may be used interchangeably and refer to properties defined either directly or indirectly as a result of a user action.

As referenced to herein, the term "location" refers to the location of any user device. For example, location may be the location of a user set-top box or a user mobile device, either in or out of a home.

As referenced to herein, the term "content capture device" refers to user devices which may be used to upload content to a server either continuously or at specified time intervals. Alternatively, content capture devices may also refer to commercial or professional devices such as cameras used by media providers to broadcast live events.

In a first exemplary embodiment, the media guidance application may receive at a server, a first video asset from a first content capture device at a first location and a second video asset from a second content capture device at a second location. For example, the media guidance application may receive at a server, a video uploaded by John to the server with his cell phone. In this example, the media guidance application may also receive at the server, a video uploaded by Claire to the server from the set-top box used by Claire. In this example, John may have been a spectator at the Capitals-Hurricanes hockey game in DC, and may have uploaded his reaction to TJ Oshie's goal in the first period. Claire may have been watching the Capitals-Hurricanes game from her home in Boston, and her reaction to the TJ Oshie goal may have been captured by her set-top box.

Alternatively, the media guidance application may receive a video feed directly from a broadcaster. For example, camera crews at sport events such as football games, baseball games or hockey games may simultaneously broadcast the game, and also have cameras scanning the audience and uploading or transmitting the audience feed to the server. For example, an audience-focused camera at a football game may look for enthusiastic fans, for people holding up signs, for people having interesting face painting, or for people exhibiting behavior of interest (e.g., taking too many selfies, dancing, drinking too much, kissing, having an argument, etc.). In alternative examples, the media guidance application may receive at the server a combination of the above-described user videos and professional videos.

In some embodiments, the media guidance application may, in near-real time, determine a first characteristic of the first video asset and assign a first content tag to the first video asset corresponding to the first characteristic. For example, the media guidance application may determine that a characteristic of John's video is "R" rated, due to his use of profanities. The media guidance application may determine that another characteristic of John's video is "Sports," "Hockey," "Capitals," or any combination thereof.

In alternative examples, the media guidance application may determine multiple characteristics for the same video feed segment. For example, a sequence of a college aged fan with face paint may be characterized as "intense" and "college" and "bros" and if the face painting is associating with a team, e.g., the Patriots, "Patriots."

In alternative examples, the media guidance application may split the video feed into fixed time intervals and assign characteristics to each time intervals. In one example, the media guidance application may assign at least one characteristic to each time interval. In another example, the media guidance application may not assign a characteristic to every time interval. In alternative examples, the media guidance application may automatically split the video feed based on content recognition. For example when a video feed changes subject or changes position, the media guidance application may initiate a new segment.

In some embodiments, the media guidance application may, in near-real time, determine a second characteristic of the second video asset and assign a second content tag to the second video asset corresponding to the second characteristic. For example, the media guidance application may determine that a characteristic of Claire's video is "cute" or "T-shirt humor" based on her facial expressions or because of the "I love TJ Oshie" t-shirt she was wearing in the video.

Alternatively, when the cell phone of a user, e.g., Dave, is the second content capture device, the media guidance application may determine that a characteristic associated with the video asset from Dave's cell phone is related to what Dave was watching. For example, Dave may be commenting on a movie or TV series, such as "Game of Thrones" by saying "Can you believe what Tyrion just did?" In this example, the media guidance application may determine characteristics of the second media asset (Dave's video) associated with Dave's reaction and associated with the subject of Dave's reaction. In this example, characteristics of the media asset associated with Dave's reaction may be "surprise" "confusing," or "excitement" and characteristics of the media asset associated with the subject of Dave's reaction may be "new episode," "plot twist," "Tyrion," and "Game of Thrones."

In an alternative example, the media guidance application may receive a user-generated video of patrons at a Bruins game which includes footage of a fan with a Patriots jersey. The media guidance application may assign the video multiple characteristics such as "everyday," "Patriots," "football," "Hockey," "confused" and "TD Garden."

In another example, the media guidance application may receive a user-generated video of someone making a joke in front of the Liberty Bell. The media guidance application may assign the video characteristics such as "Liberty," "Monuments," "Philadelphia," and "Joke."

In some embodiments, the media guidance application may receive a video-feed request from a third location. For example, Max may be watching the Capitals-Hurricanes game at home in Baltimore, by himself. Because Max may be missing his friends and the atmosphere of a hockey game, Max may request a video-feed of user-videos related to the Capitals-Hurricanes game.

Alternatively, the media guidance application may receive video-feed requests from a group of friends who are in different locations but wish to share a show or a sporting event. For example, the media guidance application may receive requests from Abe, Brad and Colin for a "TerribleThree" video feed.

In some embodiments, the media guidance application may process the video feed request from the third location to determine a video feed criterion For example, Max may have requested a "funny" video feed specifically for the Capitals-Hurricanes game. Alternatively, Max may have specified, for example in a user profile, that his favorite hockey team is the Capitals, and that he is a 23 year old male.

In the "TerribleThree" example above, the media guidance application may process the video feed request at Abe, Brad and Colin's locations and find that their request is for a feed of their closed group's reactions to the Bruins game. The video feed in this example may be narrowly defined, for example with a specific combination of characteristics or a custom criterion (as defined for example via user input and shown in FIG. 10), such as "Terrible Three." In this example, a video feed will only have the "Terrible Three" characteristic under certain conditions.

In some embodiments, the media guidance application may input the video feed criterion into a database listing characteristics that meet criteria to determine that the first characteristic and the second characteristic meet the video feed criterion. For example, the media guidance application may input the video feed criterion from Max's request "funny" into a database listing corresponding characteristics. In this example, for a 23 year old male, "funny" may correspond to characteristics including "R" and "T-shirt humor."

Alternatively, the media guidance application may input the video feed criterion from Abe, Brad and Colin's requests "TerribleThree" into a database listing corresponding characteristics. In this example, the database may indicate that to match the "TerribleThree" criterion, the characteristics must be the location of Abe, the location of Brad, or the location of Colin. In this example, only videos originating from Abe, Brad and Colin would be found to have characteristics matching the "TerribleThree" requested video feed criterion.

In some embodiments, the media guidance application may, in response to determining that the first characteristic and the second characteristic meet the video feed criterion, automatically generate for display a video feed including the first video asset and the second video asset on a display device at the third location. For example, the media guidance application may automatically generate for display at Max's device, a video feed which includes the video received from John's cell-phone, or the video received from Claire's set-top-box.

Alternatively, the media guidance application may automatically generate for display, at Abe, Brad and Collin's devices, a video feed which includes videos generated at each of the three users' locations, allowing them to share their reaction to a particular broadcast or event.

In some embodiments, the media guidance application may insert additional videos or advertisements into the video feed, in addition to the first and second media assets with characteristics matching the video feed criterion. For example, when the media guidance application determines that no media asset matches the requested video feed criterion, the media guidance application may expand the video feed criterion, to allow media assets which may be related to or close to the video feed criterion to be generated for display in the video feed. Alternatively, the media guidance application may fill gaps in the video feed generated for display by selecting advertisements which are related to the media assets generated for display. For example, in a video feed of funny fan reactions to the Capitals-Hurricanes game, the media guidance application may, between two user-generated videos selected to be generated for display, insert an advertisement for Halloween costumes including Red Rockers and Slapshot costumes. Alternatively, when no media assets match the requested video feed criterion, the media guidance application may generate for display a uniform background, or generate for display a message indicating that no matching media asset was found, such as "Wait—looking for the next video," or "No video found, consider changing your request."

In some embodiments, the media guidance application performs automatic content recognition of the first video asset and the second video asset to determine the first characteristic and the second characteristic, using at least one of video recognition, text recognition and metadata analysis For example, the media guidance application may perform automatic content recognition of Claire's video to determine that her t-shirt reads "I love TJ Oshie" and because TJ Oshie is a player on the Capitals roster this is related to the Capitals and may be tagged "T-shirt humor." In this example, the media guidance application may also perform automatic recognition of Claire's facial expressions to detect if she is smiling, laughing or jumping up and down in excitement. In the same example, the media guidance application may perform automatic recognition on the video received from John's cell phone, to determine that John is yelling profanities, and the video may be tagged "R-rated". The media guidance application may also process the metadata associated with the video from John's cell phone and determine that the video was uploaded at Verizon Center, and may be tagged "Verizon Center."

In some embodiments, the media guidance application determines a level of uncertainty associated with the first or second content tags and provides the first video asset or second video asset to a human curator to approve or edit the first or second content tag. For example, the media guidance application may perform automatic content recognition on the video received from John's cell phone and determine with 40% confidence that John is saying "Let's go Caps." In this example the media guidance application may send John's video to a human curator to determine whether the media guidance application accurately interpreted John's words "Let's Go Caps" or whether John is saying something else. For example, in the event that the media guidance application was correct, the human curator may confirm the interpretation. Alternatively, in the event that the media guidance application was incorrect, the human curator may enter the correct interpretation, or enter a correct content tag, such as "R-rated" if John is swearing instead of saying "Let's go Caps."

In an exemplary embodiment, the certainty threshold for confirming a characteristic and the corresponding tag for a media asset may be set by the user. Alternatively, the certainty threshold may be set by the system. Alternatively, the certainty threshold may vary depending on characteristics. For example, a certainty threshold for tagging content as "R-rated" may be relatively high (70%) to require review for all "R-rated" characteristics with a certainty value below the 70% threshold—this conservative threshold may help avoid R-rated content being generated for display to users who do not expect R-rated content. Alternatively, a certainty threshold for a characteristic such as "comedy" may be lower, such as 40%. In this example, "comedy" characteristics with a certainty level between 40-100% would not be subject to human curator review.

In some embodiments, the media guidance application assigns a content corresponding to a characteristic which identifies a human curator. For example, a human curator may be identified by a specific content tag which may be an identification sequence, or a content tag which may be recognizable by users, such as "CapsFan123" or "JohnWalton."

In some examples, users may request a video feed with a characteristic including a specific human curator, such as "JohnWalton" if users have liked videos tagged by "JohnWalton" in the past.

In another example, a characteristic may also be a popularity rating, such as an indication of how many users requested a video feed with the same criterion, or how many video feed requests resulted in the selection of a particular media asset. For example, a video feed request for a combination of "funny," "hockey," and "newbies" may be common amongst users. In this example, the media guidance application may assign an additional tag to media assets with characteristics matching the "funny," "hockey" and "newbies" criterion, such as "popular" or "must see."

In some embodiments, the media guidance application accesses a user profile and retrieves from the user profile the video feed criterion. For example, as described above Max may indicate in his user profile that his favorite teams are the Jaguars, the Capitals, and the Red Sox, that he is 23 years old, and enjoys funny home videos, and R-rated movies. In this example, the media guidance application may process information from Max's user profile and determine video feed criterion which match Max's interests.

Alternatively, the media guidance application may automatically acquire information about a user's location, or a user's preferences based on the channels a user subscribes to. Alternatively, the media guidance application may communicate with other user devices to acquire additional user information. For example, the media guidance application may be in communication with a user's phone, a user's computer, and have access to a user's web browser history, Facebook searches, and Twitter followers.

In some embodiments, the media guidance application determines the video feed criterion automatically from user behavior. For example, the media guidance application may determine Max's favorite teams and like of R-rated movies based on when John typically tunes in, or which programs he most frequently watches, for example the Patriots, or R-rated movies. Alternatively, the media guidance application may provide a user with an option to rate a requested video feed with "like" and "dislike." Alternatively, the media guidance application may provide a user with an option to rate individual segments or media assets shown within a requested video feed as "like" or "dislike" or with a scaled rating (e.g., from 1 to 5). In another example, the user may be able to skip a particular segment or media asset shown in the video feed without affecting the rating of the asset of the feed. In this example, the media guidance application may use the user feedback on media assets and video feeds to adapt and improve the video feeds generated for display in response to a user request. For example, Adam may have indicated that the Colts are his favorite team, but in his requested "funny" "football" video-feed he also repeatedly dislikes videos which include Patriots fans. In this example, the media guidance application may detect that Adam does not like the Patriots and automatically screen media assets to no longer generate for display media assets which have the characteristics "funny," "football" and "patriots."

In some embodiments, the media guidance application determines that a video feed is public and shares the video feed with other users. For example, the media guidance application may have received a video feed request from Max for funny R-rated videos related to the Capitals-Hurricanes game. In this example, other users may have similar interests and when the media guidance application makes Max's requested video-feed publicly available, other users may browse from a listing of video-feeds and select the video feed already requested by Max. In this example the other users would also see funny R-rated videos related to the Capitals-Hurricanes game. In this example, the users may not need to specify the characteristics of the video-feed and may just select to watch Max's requested video feed.

Figure 9:
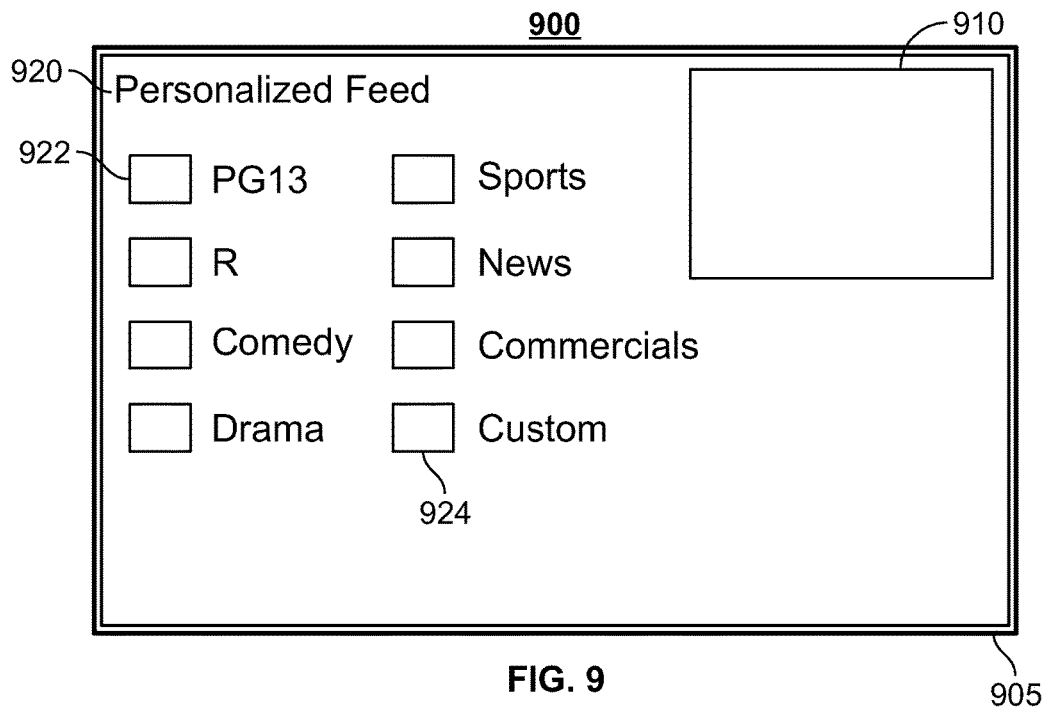
FIGS. 9 and 10 show an illustrative media guidance application for requesting video-feeds in accordance with some embodiments of the disclosure.
Figure 10:
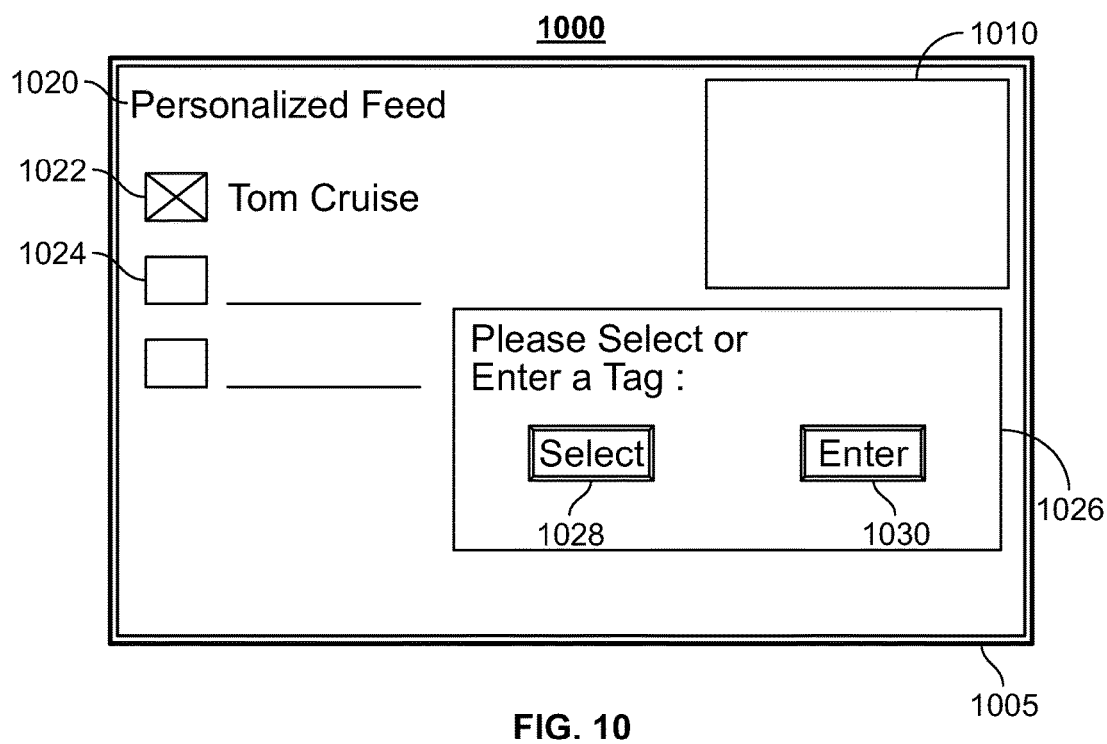

In one example, the media guidance application may allow Max to make his newly requested video feed public. In this example, another user may access a menu for requesting a video feed (e.g. as shown in FIGS. 9-10) and options may include an option to access a listing of other user's public feeds. In an alternative embodiment, Max may select to share his requested video feed with only a few other users, by emailing or sending a message or link to his feed to other users through the media guidance application.

In some embodiments, the media guidance application generates for display the video feed in a picture-in-picture window on the display device. For example, the media guidance application may allow Max to watch the Capitals-Hurricanes game on NHL Center Ice in full screen mode, but may also generate for display for Max the requested video-feed for funny R-rated videos related to the game in a picture-in-picture window. In this example, the media guidance application allows Max to watch the game from his home but also experience the kind of interactions Max enjoys when he goes to the game.

In some embodiments, the media guidance application may generate for display two or more requested video feeds in two or more picture-in-picture windows. In this example, David may be able to watch the Colts-Patriots game on the main display area, to watch an "R-rated" and "funny" video feed in one picture-in-picture display area, and to watch a "Colts fans" "awesome" video feed in another picture-in-picture display area.

In some embodiments, the media guidance application generates for display the video feed on a display device at a fourth location. For example, the media guidance application may generate for display the video feed on Max's television in his living room, and on the television in his friend Jed's room. In this example the media guidance application generates for display the video feed request by Max in two different locations which may be within the same home network, or in different home networks.

In some embodiments, the media guidance application determines first and second characteristics which include actor, genre, year, theme and age rating. For example, the media guidance application may assign content tags such as "Johnny Depp" and "Comedy" to the movie "Pirates of the Caribbean." In some embodiments, characteristics and content tags may include references to other platforms, such as social media platforms "#Deflategate" for Twitter, or Instagram or Youtube handles.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
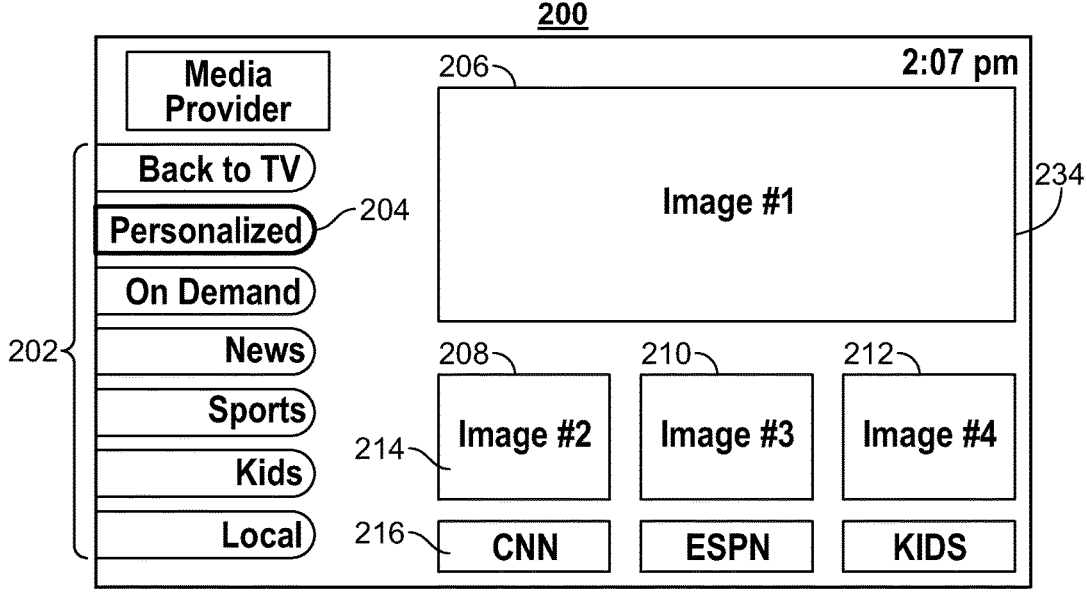
FIG. 2 shows an illustrative media guidance application that may be used to request video-feeds in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, Personalized option 204 is selected, thus providing listings 206, 208, 210, and 212 as broadcast program listings, and providing options for additional personalized feeds, as defined in FIGS. 9 and 10. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
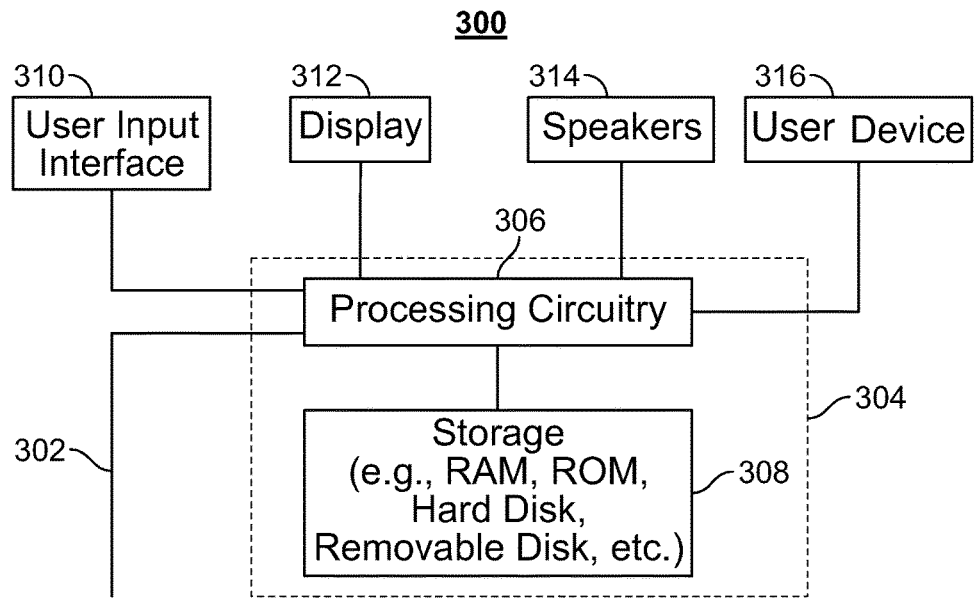
FIG. 3 is a block diagram of an illustrative media system in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
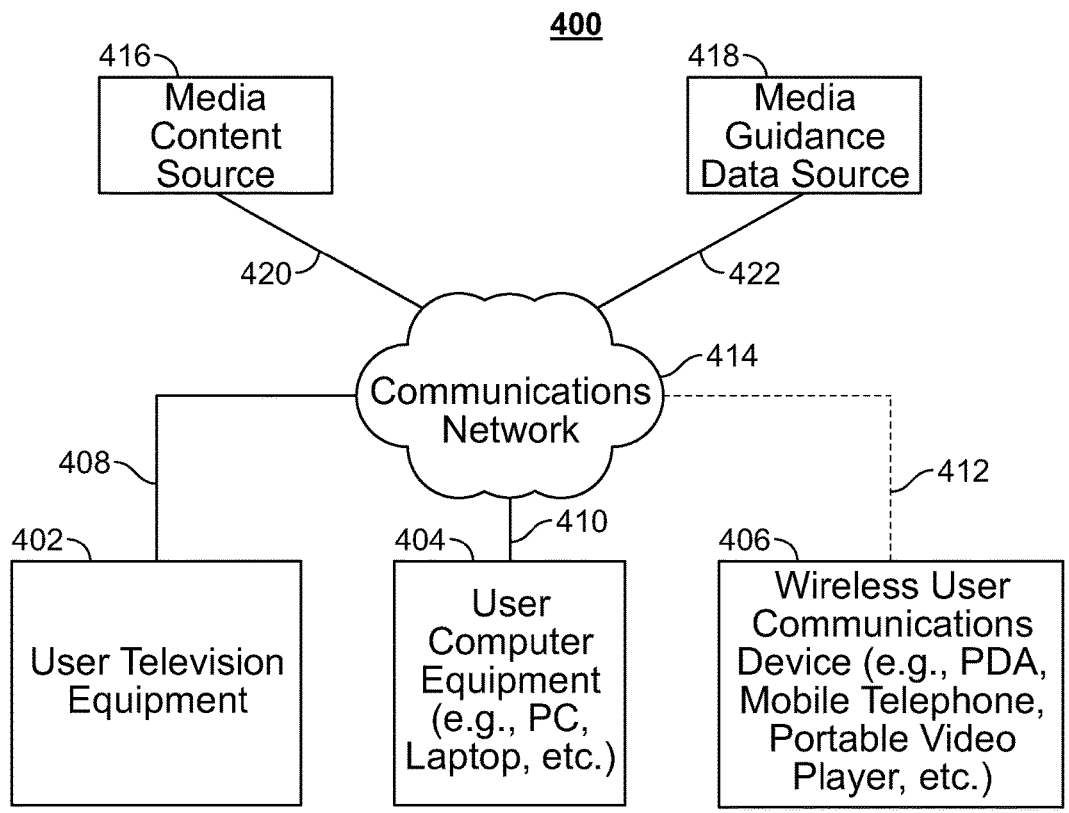
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
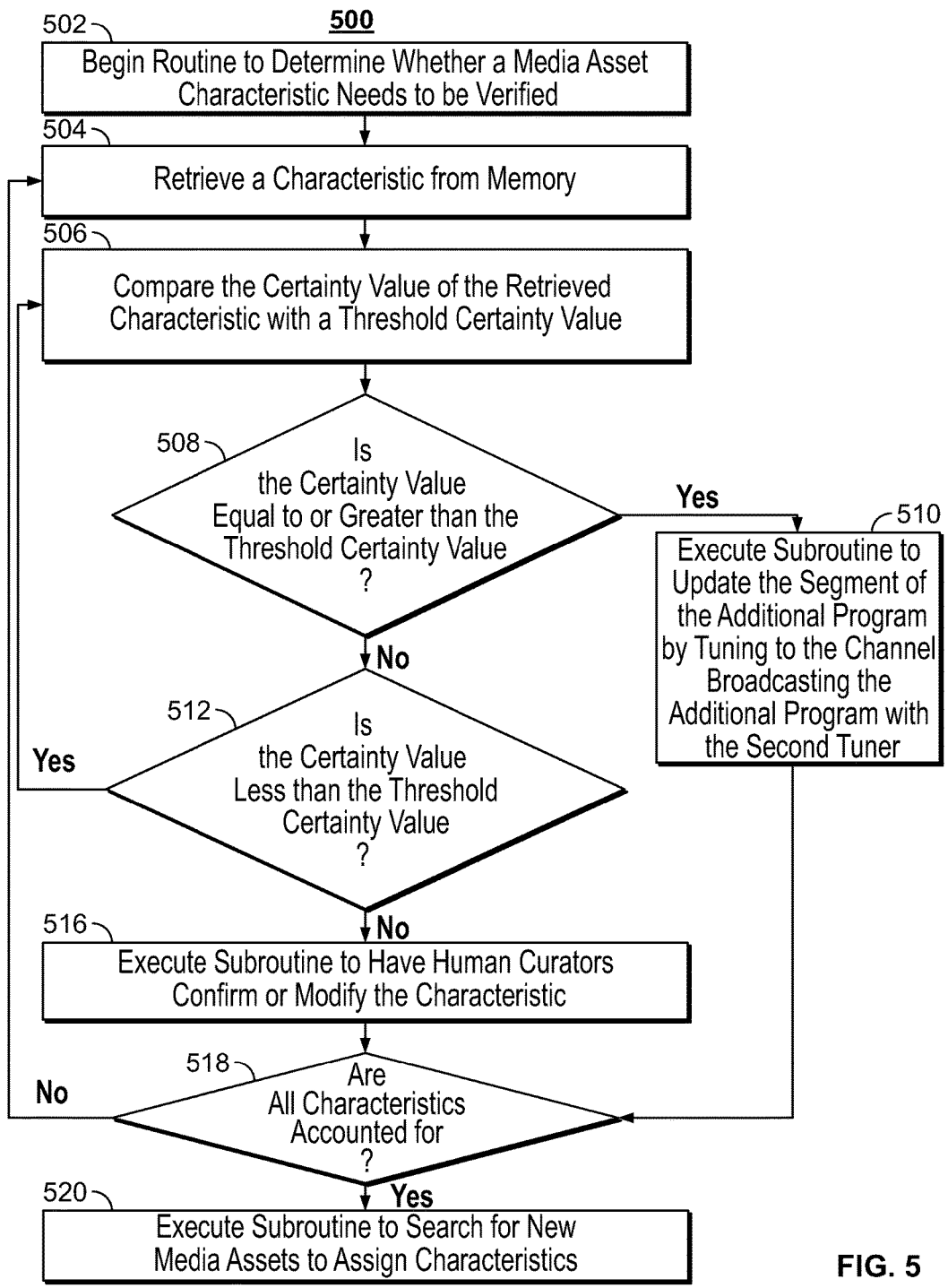
FIG. 5 is a flowchart of illustrative steps involved in determining whether a characteristic has a level of certainty above a specified certainty threshold, in accordance with some embodiments of the disclosure.

FIGS. 5 and 6 present an algorithm for control circuitry (e.g., control circuitry 304) to determine a level of certainty in assigning characteristics to media assets in accordance with some embodiments of the disclosure. In some embodiments this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes an algorithm for control circuitry (e.g., control circuitry 304) to guarantee a level of certainty above a specified threshold in assigning characteristics to media assets in accordance with some embodiments of the disclosure.

At step 502, control circuitry 304 determines certainty levels will begin based on receiving media assets which need to be tagged. In some embodiments, this may be done either directly or indirectly in response to a user action or input (e.g., from signals received by control circuitry 304 or user input interface 310). For example, process 500 may begin directly in response to control circuitry 304 receiving signals from user input interface 310, or control circuitry 304 may prompt the user to confirm their input using a display (e.g., by generating a prompt to be displayed on display 312) prior to running process 500.

At step 504, control circuitry 304 proceeds to retrieve the next instance of a characteristic from stored memory. In some embodiments control circuitry 304 may receive a single primitive data structure that represents the value of characteristics. In some embodiments the value may be stored as part of a larger data structure, and control circuitry 304 may retrieve the value by executing appropriate accessor methods to retrieve the value from the larger data structure.

At step 506, control circuitry 304 proceeds to compare the value of characteristics to the stored value of a certainty threshold. In some embodiments, the value of certainty threshold may be stored (e.g., on storage device 308) prior to beginning the algorithm. In some embodiments the value of a certainty threshold may also be retrieved for each and every instance of characteristics, and the value of a certainty threshold may change from iteration to iteration. In some embodiments, control circuitry 304 may directly compare the value of a certainty threshold with the value of characteristics by accessing the values respectively from memory and performing a value comparison. In some instances, control circuitry 304 may call a comparison function (e.g., for object to object comparison) to compare characteristics and a certainty threshold.

At step 508, control circuitry 304 compares the values of characteristics and a certainty threshold to determine if the value of characteristics is greater or equal to the value of a certainty threshold. If the condition is satisfied, process 500 may proceed to step 510; if the condition is not satisfied, the process 500 may proceed to step 512 instead.

At step 510, control circuitry 304 will execute a subroutine to confirm the characteristic for the media asset based on the condition at step 508 being satisfied. After the subroutine is executed, the process 500 may proceed to step 518 where it is determined if all instances of characteristics are accounted for and further iterations are needed.

At step 512, control circuitry 304 compares the values of characteristics and a certainty threshold to determine if the value of characteristics is less than the value of a certainty threshold. If the condition is satisfied, the process 500 may proceed to step 514; if the condition is not satisfied, process 500 may proceed to step 516 instead.

At step 516, control circuitry 304 will execute a subroutine to have human curators confirm or modify the characteristic based on both of the conditions in 508 and 512 not being satisfied. After the subroutine is executed, the process 500 may proceed to 518 where it is determined if all instances of characteristics are accounted for and if further iterations are needed.

At step S18, control circuitry 304 will check if all instances of characteristics are accounted for. If all of the instances have been evaluated, control circuitry 304 may proceed to step 520. For example, control circuitry 304 may call a function to see if there is a next element of characteristics. If the function returns true (i.e., there are still instances that need to be processed), control circuitry 304 may proceed to step 504.

At step 520, control circuitry 304 will execute a subroutine to search for new media assets to assign characteristics.

It is contemplated that the descriptions of FIG. 5 may be used with any other embodiment of this disclosure. In addition, the descriptions described in relation to the process 500 of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several instances of characteristics may be evaluated in parallel, using multiple logical processor threads, or the process 500 may be enhanced by incorporating branch prediction. Furthermore, it should be noted that process 500 of FIG. 5 may be implemented on a combination of appropriately configured software and hardware, and that any of the devices or equipment discussed in relation to FIGS. 3-4 could be used to implement one or more portions of the process 500.

The pseudocode in FIG. 6 describes an algorithm to determine whether a characteristic of a media asset needs to be confirmed or modified in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 may run a subroutine to initialize variables and prepare to determine whether the characteristic may be confirmed or modified, which begins on line 605. For example, in some embodiments control circuitry 304 may copy instructions from non-transitory storage medium (e.g., storage device 308) into RAM or into the cache for processing circuitry 306 during the initialization stage. Additionally, in some embodiments the value of a certainty threshold being used for comparison, or a tolerance level for determining if two values are essentially equivalent, may be retrieved, set, and stored at 601.

At line 605, control circuitry 304 may receive instances of characteristics. In some embodiments these instances may be retrieved from stored memory. Control circuitry 304 may receive instances of characteristics by receiving, for example, a pointer to an array of values of characteristics. In another example, control circuitry 304 may receive an object of a class, such as an iterator object containing elements of characteristics.

At line 606, control circuitry 304 may iterate through the various instances of characteristics, if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 will store the value of characteristics into a temporary variable "A." In some embodiments the value of characteristics will be stored as part of a larger data structure or class, and the value of characteristics may be obtained through appropriate accessor methods. In some embodiments characteristics may be converted from a string or other non-numeric data type into a numeric data type by means of an appropriate hashing algorithm. In some embodiments, control circuitry 304 may call a function to perform a comparison of characteristics to a certainty threshold. In some embodiments characteristics may be encoded as a primitive data structure, and rather than using a temporary variable, characteristics may be directly used in the comparisons at lines 609 and 611.

At line 608, control circuitry 304 will store the value of a certainty threshold into a temporary variable "B." Similar to characteristics, in some embodiments the value of a certainty threshold will be stored as part of a larger data structure or class, and the value of a certainty threshold may be obtained through accessor methods. In some embodiments a certainty threshold may be converted from a string or other non-numeric data type into a numeric data type by means of control circuitry 304 executing an appropriate hashing algorithm, or a certainty threshold may be a primitive data structure, and may be directly used in the comparisons at lines 609 and 611.

At line 609, control circuitry 304 compares the value of A to the value of B to see if they are essentially equivalent. This is achieved by subtracting the value of B from A, taking the absolute value of the difference, and then comparing the absolute value of the difference to a predetermined tolerance level. In some embodiments the tolerance level may be a set percentage of either A or B. In some embodiments the tolerance level may be a fixed number. For example, setting the tolerance level to a set multiple of machine epsilon may allow for the control circuitry 304 to account for small rounding errors that may result from the use of floating point arithmetic. In some embodiments the tolerance level may be set to zero, or the condition inside the IF statement may be replaced with a strict equivalence between A and B.

At line 610, control circuitry 304 will execute a subroutine to determine default characteristic approval settings using control circuitry if the condition in line 609 is satisfied. In some embodiments this may be achieved by processing circuitry 306 sending the appropriate signals to control circuitry.

At line 611, control circuitry 304 will compare the value of A and B to determine if A is less than B. In some embodiments this comparison will only be done if A is not essentially equivalent to B and the comparison in line 609 evaluates to FALSE.

At line 612, control circuitry 304 will execute a subroutine to confirm the characteristic for the media asset using control circuitry if the condition in line 611 is satisfied.

At line 613, control circuitry 304 will determine whether neither condition in line 609 or 611 are satisfied. If neither condition is satisfied, then the instruction at line 614 may be evaluated and executed.

At line 614, control circuitry 304 will execute a subroutine to have human curators confirm or modify the characteristics using control circuitry if neither of the conditions at lines 609 or 611 are satisfied.

At line 616, control circuitry 304 may run a termination subroutine after the control circuitry 304 has performed the algorithm of FIG. 6. For example, in some embodiments control circuitry 304 may destruct variables, perform garbage collection, free memory or clear the cache of processing circuitry 306.

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch. In some embodiments, rather than iterating over all instances of characteristics at step 506, in some embodiments the code may be rewritten so control circuitry 304 is instructed to evaluate multiple instances of characteristics simultaneously on a plurality of processors or processor threads, lowering the number of iterations needed and potentially speeding up computation time.

Figure 7:
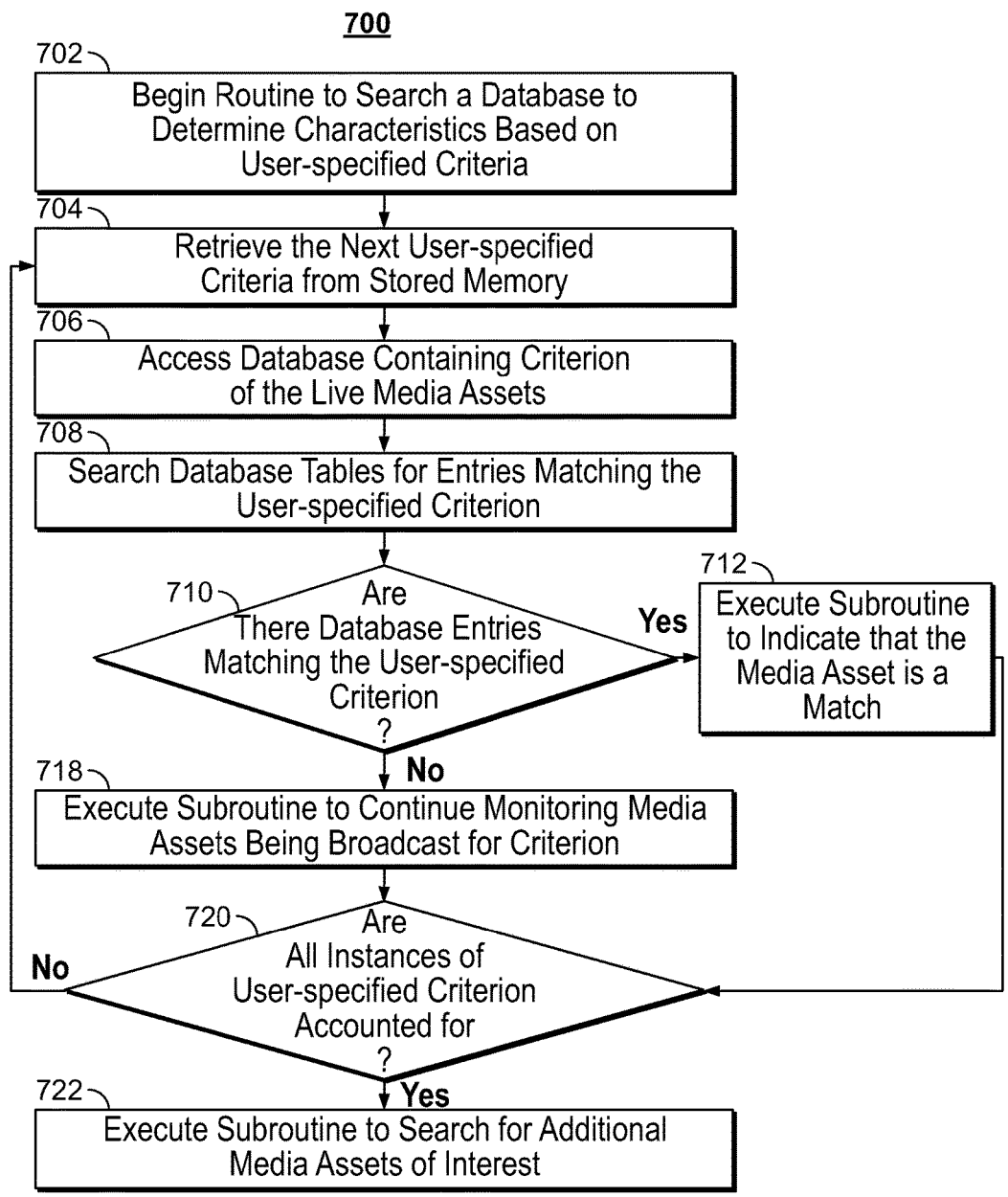
FIG. 7 is a flowchart of illustrative steps involved in determining characteristics in a media asset, using a database containing characteristics and user-specified criterion, in accordance with some embodiments of the disclosure.

FIGS. 7 and 8 present an algorithm for control circuitry (e.g., control circuitry 304) to determine media assets matching video feed criterion using a database containing possible values of video feed characteristics in accordance with some embodiments of the disclosure. Similar to the algorithms described by FIGS. 5 and 6, in some embodiments control circuitry 304 may encode this algorithm on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process 700 for control circuitry (e.g., control circuitry 304) to search a database and determine characteristics of media assets in accordance with some embodiments of the disclosure.

At step 702, the control circuitry 304 searches a database and determines characteristics of media assets may begin based on receiving media assets. In some embodiments, this may be done either directly or indirectly in response to a user action or input (e.g., from signals received by control circuitry 304 or user input interface 310), for example in response to a user request for a personalized video-feed.

At step 704, control circuitry 304 may proceed to retrieve the next instance of a user-specified criterion from stored memory. In some embodiments control circuitry 304 may retrieve a single primitive data structure that represents the value of the user-specified criterion. In some embodiments control circuitry 304 may retrieve the value from a larger class or data structure.

At step 706, control circuitry 304 accesses a database containing possible values or tags for user-specified criterion. In some embodiments, this database may be stored locally (e.g., on storage device 308) prior to beginning the process 700. In some embodiments the database may also be accessed by using communications circuitry to transmit information across a communications network (e.g., communications network 414) to a database implemented on a remote storage device (e.g., media guidance data source 418).

At step 708, control circuitry 304 may search database tables for entries matching the user-specified criterion. In some embodiments this may be done by comparing an identifier, for example a string, integer or tag representing a user-defined criterion, that matches the types of identifiers used inside the database. In some embodiments control circuitry 304 may submit a general query to the database for table entries matching user-specified criterion, and control circuitry 304 may receive a list of indices or a data structure containing a portion of the database contents. In some embodiments the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the process 700 of FIG. 7 may be implemented using multiple independent or cross-referenced databases.

At step 710, control circuitry 304 may determine if there are database entries matching user-specified criterion for a requested video feed. In some embodiments control circuitry 304 may receive a signal from the database indicating that there are no matching entries. In some embodiments control circuitry 304 may instead receive a list of indices or data structures with a NULL or dummy value. If control circuitry 304 identifies that there are database entries matching the user-specified criterion the process 700 may proceed to step 712, otherwise the process 700 proceeds to step 714.

At step 712, control circuitry 304 may execute a subroutine to indicate that a media asset is a match with some entries and should be added to the requested video-feed. Afterwards, the process 700 may proceed to step 720 where it is determined if there are further instances of user-defined criterion that need to be accounted for.

At step 718, control circuitry 304 will execute a subroutine to continue monitoring received media assets for user-specified criterion after determining that there were no matching database entries for user-specified criterion. Afterwards, the process 700 may proceed to step 720.

At step 720, control circuitry 304 will determine if all instances of user-specified criterion are accounted for and if further iterations are needed. If further iterations are needed the process 700 will loop back to step 704 where control circuitry 304 will retrieve the next instance of user-specified criterion. If no further iterations are needed the process 700 will proceed to step 722.

At step 722, control circuitry 304 will execute a subroutine to search for additional received media assets.

It is contemplated that the descriptions of FIG. 7 may be used with any other embodiment of this disclosure. In addition, the descriptions described in relation to the process 700 of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the process 700. As a further example, although step 712 and step 716 are described as being mutually exclusive, both exact entries and similar entries may be processed for a single instance of user-specified criterion. To further this purpose, in some embodiments step 710 and step 714 may be performed in parallel by control circuitry 304. Furthermore, it should be noted that the process 700 of FIG. 7 may be implemented on a combination of appropriately configured software and hardware, and that any of the devices or equipment discussed in relation to FIGS. 3-4 could be used to implement one or more portions of the process 700.

The pseudocode in FIG. 8 describes an algorithm to search a database for characteristics based on user-specified criterion in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the control circuitry 304 may run a subroutine to initialize variables and prepare to match user-specified criterion and media asset characteristics, which begins on line 805. For example, in some embodiments control circuitry 304 may copy instructions from non-transitory storage medium (e.g., storage device 308) into RAM or into the cache for processing circuitry 306 during the initialization stage.

At line 805, control circuitry 304 may receive instances of user-specified criterion. In some embodiments these instances may be retrieved from user input.

At line 806, control circuitry 304 may iterate through the various instances of user-specified criterion; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the instances of user-specified criterion in a single class or encapsulated data structure that will perform the loop as part of an internal method.

At line 807, control circuitry 304 may query a database for entries matching user-specified criterion. Depending on how the database is implemented and how user-specified criterion are stored, an intermittent step may be required to convert user-specified criterion into a form consistent with the database. For example, user-specified criterion may be encoded into a string or an integer by control circuitry 304 using an appropriate hashing algorithm prior to being transmitted to the database by control circuitry 304 as part of a query. In some embodiments user-specified criterion may be encoded as a primitive data structure, and control circuitry 304 may submit user-specified criterion as a query to the database directly. After querying the database, control circuitry 304 may receive a set of database entries matching user-specified criterion. In some embodiments control circuitry 304 may receive these entries in the form of a data-structure, a set of indices of the database, or a set of indices of another cross-referenced database.

At line 808, control circuitry 304 will determine if there are any database entries matching user-specified criterion. In some embodiments control circuitry 304 may determine this by checking if the database returned an empty data structure or a NULL value in response to the query in line 807. If there are matching database entries the control circuitry 304 may proceed to line 809. If there were no matching database entries the control circuitry 304 may instead proceed to execute line 812.

At line 809, control circuitry 304 may retrieve one or more values of characteristics from the database entries matching user-specified criterion. For example, if control circuitry 304 retrieves a list of indices after querying the database in line 807, in some embodiments control circuitry 304 may retrieve the database entries for characteristics located at the received indices. In some embodiments the indices may point to a larger data structure contained within the database, and control circuitry 304 may retrieve the values of characteristics from within the data structure using appropriate accessor methods. In some embodiments control circuitry 304 may retrieve the values of characteristics and store them in a separate data structure locally (e.g., in storage 308) prior to proceeding further. After retrieving the values of characteristics the control circuitry 304 will proceed to execute line 810.

At line 810, control circuitry 304 will execute a subroutine to use the values of characteristics and indicate that the media asset is a match for the user-specified criterion using control circuitry. Afterwards, the control circuitry 304 may proceed to execute line 815.

At line 814, control circuitry 304 will execute a subroutine to continue monitoring the media assets using control circuitry if neither of the conditions at lines 809 or 811 are satisfied.

At line 815, control circuitry 304 will execute a subroutine to search for additional media assets using control circuitry. Afterwards, the control circuitry 304 may proceed to execute the termination subroutine at line 817.

At line 817, control circuitry 304 may execute a termination subroutine after the control circuitry 304 has performed the algorithm of FIG. 8 and all instances of user-specified criterion have been processed and checked against the database. For example, in some embodiments control circuitry 304 may destruct variables, perform garbage collection, free memory or clear the cache of processing circuitry 306.

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of user-specified criterion and submit multiple database queries simultaneously using a plurality of processors or processor threads. It is also understood that although we may describe control circuitry 304 interacting with a single database, this is only a single embodiment described for illustrative purposes, and the algorithm of FIG. 8. may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

FIG. 9 show an illustrative media guidance application for requesting video-feeds in accordance with some embodiments of the disclosure.

A display device 900 includes a main display area 905 and an additional display area 910. The additional display area 910 may be located anywhere within the main display area 905. In one embodiment, a media asset previously generated for display for a user in the main display area 905 may be generated for display in the picture-in-picture additional display area 910, while menu elements 920, 922 and 924 may be generated for display over a fixed background. In alternative embodiments elements 920, 922 and 924 may be generated for display as an overlay over a media asset generated for display in main display area 905, and there may not be an additional display area 910. In the exemplary embodiment of FIG. 9 display element 920 indicates a menu screen intended to personalize video feeds. The menu shown in FIG. 9 may be a separate menu option, to which a user can navigate. In alternative embodiments, the menu of FIG. 9 may be a sub-menu or option available within a user profile.

Elements 922 may be radio buttons indicating media characteristics. In the exemplary embodiment of FIG. 9 elements 922 include content rating elements ("PG13" and "R"), theme characteristics ("Comedy" and "Drama"), and genre characteristics ("Sports," "News," and "Commercials"). In alternative embodiments, elements 922 may be selectable options. In an alternative embodiment, a user may select an element 922 and access a sub-menu. For example, a user may select selectable option 922 "Comedy" and the media guidance application may generate for display an additional screen with listings of different types of comedies or other characteristics ("Romantic Comedy," "Dramatic Comedy" "1950s" "Johnny Depp," "Foreign," etc.). Element 924 provides a "Custom" option which may allow a user to create new characteristics or tags, as shown in FIG. 10.

FIG. 10 show an illustrative media guidance application for requesting video-feeds in accordance with some embodiments of the disclosure. A display device 1000 includes a main display area 1005 and an additional display area 1010. The additional display area 1010 may be located anywhere within the main display area 1005. In one embodiment, a media asset previously generate for display for a user in the main display area 1005 may be generated for display in the picture-in-picture additional display area 1010, while menu elements 1020, 1022, and 1024 may be generated for display over a fixed background. In alternative embodiments elements 1020, 1022 and 1204 may be generated for display as an overlay over a media asset generated for display in main display area 1005, and there may not be an additional display area 1010. In the exemplary embodiment of FIG. 10, display element 1020 indicates a menu screen intended to personalize video feeds. In alternative embodiments, display element 1020 may indicate a different customization level than the display element 920 in FIG. 9.

The menu shown in FIG. 10 may be a separate menu option, to which a user can navigate. In alternative embodiments, the menu of FIG. 10 may be a sub-menu or option available within a user profile. Elements 1022 may be radio buttons indicating pre-determined media characteristics provide by the media guidance application. In the exemplary embodiment of FIG. 10 element 1022 includes a pre-defined "actor" characteristic of "Tom Cruise." In the exemplary embodiment of FIG. 10, element 1024 may be a customizable option for a user to define a new characteristic. For example, a user may select element 1024, and the media guidance application may generate for display pop-up window 1026. In alternative embodiments, pop-up window 1026 may be a full-screen display.

In the exemplary embodiment of FIG. 10, pop-up window 1026 may include a message ("Please select or enter a tag") along with two selectable options, options 1028 and 1030. In this exemplary embodiment, element 1028 is a "select" option, and element 1030 is an "enter" option. In this exemplary embodiment, when a user selects element 1028, a user may be able to search for and select a characteristic or tag, for example by searching through a wider range of characteristic categories. Alternatively, when a user selects element 1030, a user may be able to enter and define a new characteristic or tag, for example by typing in the name of the characteristic or tag. In alternative embodiments, the media guidance application may allow the user to define new characteristics or tags by combining existing pre-defined and/or user-defined tags. For example, a user could define the characteristic "Silly Hockey" by combining characteristics such as "Hockey" "Bloopers" "kids" and "funny."

Figure 11:
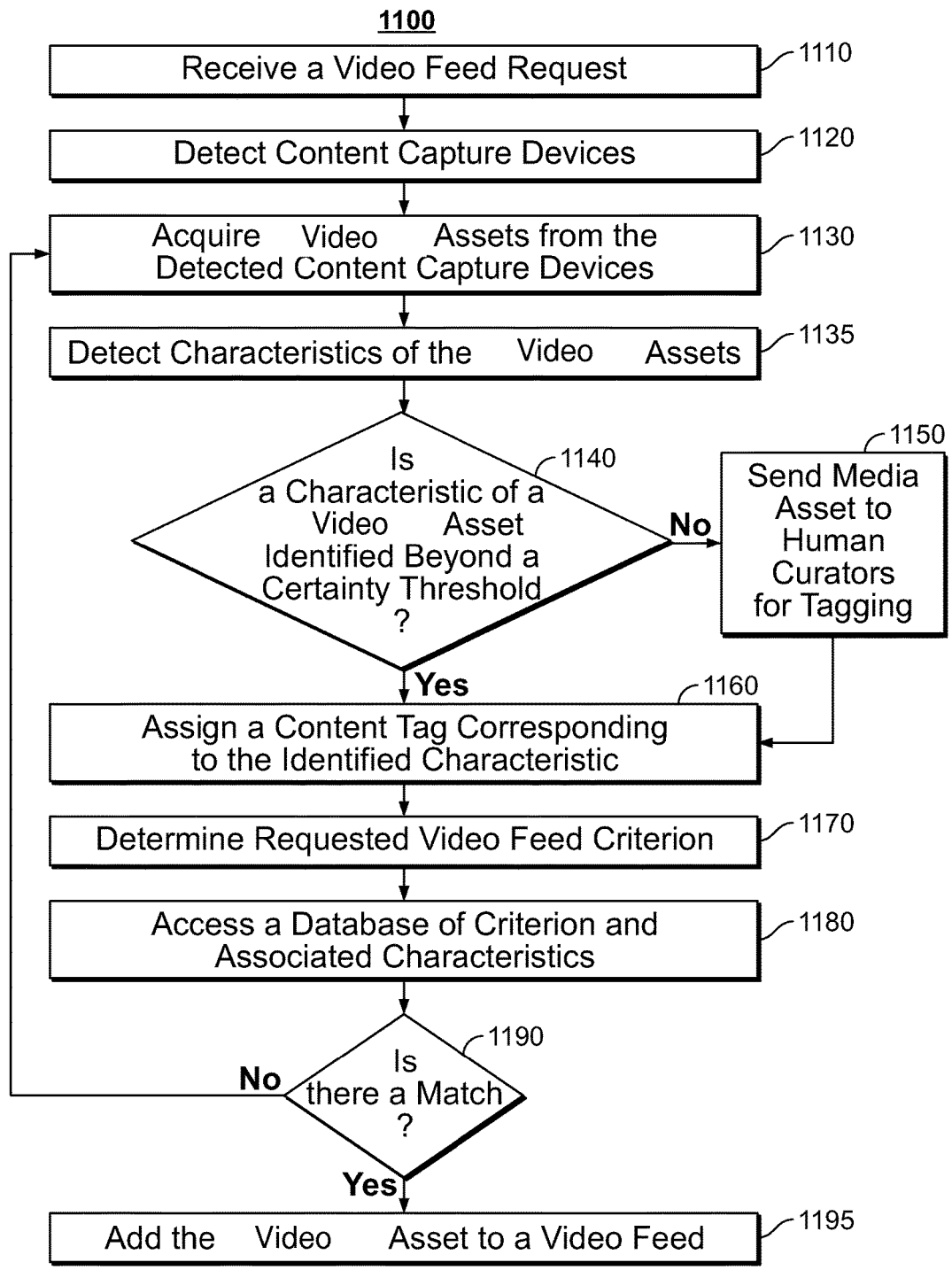
FIG. 11 is a flowchart of illustrative steps involved in requesting video-feeds, in accordance with some embodiments of the disclosure.

FIG. 11 is a flowchart of illustrative steps involved in requesting video-feeds, in accordance with some embodiments of the disclosure. It should be noted that process 1100 or any step thereof could be performed on, or provided by, any of the devices shown in FIGS. 3-5. For example, process 1100 may be executed by control circuitry 304 (FIG. 3) as instructed by a media guidance application implemented on a user device 316 (FIG. 3) in order to enhance the viewing experience of a user. In addition, one or more steps of process 1100 may be incorporated into or combined with one or more steps of any other process or embodiment.

At step 1110, the media guidance application receives, via control circuitry 304 (FIG. 3), a video feed request from a user device. For example, Sarah may request from her set-top box a video feed for an "R-rated" feed of "stadium fans" having "fun" at the Colts-Patriots game.

At step 1120, the media guidance application (e.g., implemented on illustrative user equipment device 300 (FIG. 3)) detects, via control circuitry 304 (FIG. 3), content capture devices. For example, the media guidance application may detect that John is at Gillette Stadium and streaming video on his cell phone, that Cassie is also at Gillette stadium and streaming video from her i-Pad, and that the channel covering the game has a camera dedicated to shots of the audience.

At step 1130, the media guidance application (e.g., implemented on illustrative user equipment device 300 (FIG. 3)) acquires, via control circuitry 304 (FIG. 3), video assets from the detected content capture devices. For example, the media guidance application acquires video assets (including audio and video) from John's cell phone, Cassie's I-Pad and the game coverage audience camera.

At step 1135, the media guidance application (e.g., implemented on illustrative user equipment device 300 (FIG. 3)) detects, via control circuitry 304 (FIG. 3), characteristics of the video asset. For example, the media guidance application may determine that a characteristic of the video feed from Cassie's i-Pad is "boring" because no movement is detected and Cassie is merely recording a feed showing the scoreboard. In the same example, the media guidance application may determine that the video from John's cell phone is "cool" and "young" because John appears to be rapping and John appears to be a 19-21 year old male. In the same example, the media guidance application may determine that some segments of the feed from the audience camera show "drinking" and "crazy fans" because fans are drinking and/or jumping up and down.

At step 1140, the media guidance application (e.g., implemented on illustrative user equipment device 300 (FIG. 3)) determines, via control circuitry 304 (FIG. 3), if a characteristic of a video asset has been identified beyond a pre-determined certainty threshold. For example, the media guidance application may determine whether Cassie's video feed has been correctly identified as "boring" with at least 50% certainty. If a characteristic has been identified beyond a pre-determined certainty threshold, the method proceeds to step 1160. If a characteristic has not been identified beyond a pre-determined certainty threshold, the method proceeds to step 1150.

At step 1150, the media guidance application (e.g., implemented on illustrative user equipment device 300 (FIG. 3)) sends, via control circuitry 304 (FIG. 3), the video asset to a human curator to confirm or modify the characteristic previously identified and assigned to the video asset. For example, if the certainty level associated with the "boring" characteristic for Cassie's feed is only 40%, the media guidance application may send Cassie's feed to a clearing house where human curators can review the feed and confirm or correct the characteristic. For example, a human curator may confirm that Cassie's feed is indeed "boring." Alternatively, the human curator may decide that Cassie's feed is "Not Boring," and the human curator may also indicate additional characteristics of Cassie's feed, for example "useful" because it is showing the scoreboard. The human curator may also add additional tags such as "scoreboard" or "TomBradyRocks" which may be an identifier of a human curator, as described above.

At step 1160, the media guidance application (e.g., implemented on illustrative user equipment device 300 (FIG. 3)) assigns, via control circuitry 304 (FIG. 3), to the video asset a content tag corresponding to the identified characteristic.

For example, the media guidance application may assign the content tag "boring" if Cassie's feed was confirmed as boring. Alternatively, the media guidance application may assign the tags indicated by the human-curator (e.g., "scoreboard" and "TomBradyRocks") to Cassie's feed.

At step 1170, the media guidance application (e.g., implemented on illustrative user equipment device 300 (FIG. 3)) determines, via control circuitry 304 (FIG. 3) requested video feed criterion. For example, at this step the media guidance application may process the initial video feed request from Sarah and determine that her criterion for the video feed are "R-rated" "stadium fans," "fun" and "Colts-Patriots".

At step 1180, the media guidance application (e.g., implemented on illustrative user equipment device 300 (FIG. 3)) accesses, via control circuitry 304 (FIG. 3) a database, located in storage 308 (FIG. 3) of criterion and associated characteristics. For example, the media guidance application may access a database cross-referencing video feed criterion and associated media characteristics. For example, the media guidance application may indicate that for the criterion "fun" and "R-rated" the corresponding characteristics include "cool" "young" and "crazy fans."

At step 1190, the media guidance application (e.g., implemented on illustrative user equipment device 300 (FIG. 3)) determines, via control circuitry 304 (FIG. 3), if there is a match between the determined requested video feed criterion and the content tags and associated identified characteristics of the video asset. For example, the media guidance application may determine that the video feed from John's device has characteristics "cool," "young" and "crazy fans" which match the video feed criterion for the video feed request from Sarah "fun" and "R-rated." If there is a match, the method proceeds to step 1195. If there is no match, the method returns to step 1130 and continues to acquire video assets.

At step 1195, the media guidance application (e.g., implemented on illustrative user equipment device 300 (FIG. 3)) adds, via control circuitry 304 (FIG. 3), the matching video asset to the requested video feed. For example, the media guidance application will include the media asset or portions of the media asset from John's device to a video feed generated for display on Sarah's device, for example in a picture-in-picture window while Sarah watches the Colts-Patriots game on a main area of her display device.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 11.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method for creating personalized video feeds, the method comprising:
    receiving, at a server, a first video asset from a first content capture device of a first user at a first location and a second video asset from a second content capture device of a second user at a second location, the first location corresponding to a live event, wherein the second location is remote to the first location and the second user is part of a plurality of users, and wherein a first video feed of the live event is being generated and transmitted by a content provider simultaneously to the plurality of users;
    automatically determining, in near-real time, a first characteristic of the first video asset and assigning a first content tag to the first video asset corresponding to the first characteristic and determining, in near-real time, a second characteristic of the second video asset and assigning a second content tag to the second video asset corresponding to the second characteristic;
    receiving a third content tag from the first video asset or the second video asset, wherein the third content tag corresponds to a third characteristic which identifies a human curator;
    in response to determining a level of uncertainty associated with the first video or the second video is above a threshold, providing the first video asset or second video asset to the human curator to approve or edit the first or second content tag;
    receiving a video-feed request from a third user at a third location;
    processing the video feed request from the third location to determine a video feed criterion;
    inputting the video feed criterion into a database listing characteristics that meet criteria to determine that the first characteristic and the second characteristic meet the video feed criterion; and
    in response to determining that the first characteristic and the second characteristic meet the video feed criterion:
    automatically generating for display a second video feed on a display device at the third location, wherein the second video feed includes the first video asset and the second video asset, and wherein the first video asset is generated by the first user at the first location, and the second video asset is generated by the second user at the second location; and
    presenting the second video feed to the third user at the third location concurrently with the first video feed of the live event generated by the content provider.

2. The method of claim 1, further comprising accessing a user profile; and retrieving from the user profile the video feed criterion.

3. The method of claim 1, further comprising determining the video feed criterion from user behavior.

4. The method of claim 3, further comprising determining that a video feed is public; and sharing the video feed with other users.

5. The method of claim 4, wherein the second video feed is generated for display in a picture-in-picture window on the display device.

6. The method of claim 5, wherein the second video feed is generated for display on a display device at a fourth location.

7. The method of claim 6, wherein user characteristics include any of actor, genre, year, content filter, and age rating.

8. A system for creating personalized video feeds, the system comprising:
communications circuitry; and
control circuitry that:
receives, from the communications circuitry, a first video asset from a first content capture device of a first user at a first location and a second video asset from a second content capture device of a second user at a second location, the first location corresponding to a live event wherein the second location is remote to the first location and the second user is part of a plurality of users, and wherein a first video feed of the live event is being generated and transmitted by a content provider simultaneously to plurality of users;
automatically determines, in near-real time, a first characteristic of the first video asset and assigning a first content tag to the first video asset corresponding to the first characteristic and determine, in near-real time, a second characteristic of the second video asset and assigning a second content tag to the second video asset corresponding to the second characteristic;
receiving a third content tag from the first video asset or the second video asset, wherein the third content tag corresponds to a third characteristic which identifies a human curator;
in response to determining a level of uncertainty associated with the first video or the second video is above a threshold, providing the first video asset or second video asset to the human curator to approve or edit the first or second content tag;
receives, from the communications circuitry, a video-feed request from a third user at a third location;
processes the video feed request from the third location to determine a video feed criterion;
inputs the video feed criterion into a database listing characteristics that meet criteria to determine that the first characteristic and the second characteristic meet the video feed criterion; and
in response to determining that the first characteristic and the second characteristic meet the video feed criterion:
automatically generates for display a second video feed on a display device at the third location, wherein the second video feed includes including the first video asset and the second video asset and wherein the first video asset is generated by the first user at the first location, and the second video asset is generated by the second user at the second location presents the second video feed to the third user at the third location concurrently with the first video feed of the live event generated by the content provider.

9. The system of claim 8, wherein the control circuitry accesses a user profile; and retrieve from the user profile the video feed criterion.

10. The system of claim 8, wherein the control circuitry determines the video feed criterion from user behavior.

11. The system of claim 10, wherein the control circuitry determines that a video feed is public; and sharing the video feed with other users.

12. The system of claim 11, wherein the second video feed is generated for display in a picture-in-picture window on the display device.

13. The system of claim 12, wherein the second video feed is generated for display on a display device at a fourth location.

14. The system of claim 13, wherein user characteristics include any of actor, genre, year, content filter, and age rating.

* * * * *